(12) United States Patent
Higgs et al.

(10) Patent No.: US 6,819,802 B2
(45) Date of Patent: Nov. 16, 2004

(54) HVAC SYSTEM DISPLAY

(75) Inventors: Raymond J. Higgs, Granby, CT (US); Richard P. Gonchar, Torrington, CT (US)

(73) Assignee: Carrier Corporation, Farmington, CT (US)

(*) Notice: Subject to any disclaimer, the term of this patent is extended or adjusted under 35 U.S.C. 154(b) by 657 days.

(21) Appl. No.: 09/741,252

(22) Filed: Dec. 21, 2000

(65) Prior Publication Data

US 2002/0081037 A1 Jun. 27, 2002

(51) Int. Cl.[7] ................................................. G06K 9/36
(52) U.S. Cl. ..................... 382/245; 382/233; 382/237; 382/246; 341/67; 341/59
(58) Field of Search ................................ 382/232, 233, 382/237, 239, 244, 245, 246; 341/67, 59

(56) References Cited

U.S. PATENT DOCUMENTS

| | | | | |
|---|---|---|---|---|
| 4,297,727 A | * | 10/1981 | Ogawa et al. | 358/426.13 |
| 4,376,933 A | * | 3/1983 | Saran et al. | 341/67 |
| 4,420,771 A | * | 12/1983 | Pirsch | 341/56 |
| 5,153,936 A | * | 10/1992 | Morris et al. | 345/428 |
| 5,727,036 A | * | 3/1998 | Maertens | 375/369 |
| 6,456,742 B1 | * | 9/2002 | Chan | 382/245 |

* cited by examiner

Primary Examiner—Yon J. Couso
Assistant Examiner—Ali Bayat

(57) ABSTRACT

A set of processes are disclosed for compressing and decompressing bitmapped picture files that are to be stored for later display within a control for an HVAC system. The compression process includes an examination of the first bitmapped pixel in a given bitmapped file followed by a counting of the number of consecutive pixels having the same state as the first pixel. The process continues with analyses of successive numbers of pixels of first one state and then another state and generating a numerical representations as to each number of so counted pixels until the last pixel of the bitmapped picture file data is analyzed. The resulting compressed file is stored in a memory within a control for an HVAC system so that the file can thereafter be read when the file is to be displayed. The reading and decompressing of the stored file is the reverse of the compression of the file whereby each numerical representation is analyzed with the appropriate number of pixels of a given state being produced before proceeding to analyze the next numerical representation.

11 Claims, 2 Drawing Sheets

HVAC SYSTEM DISPLAY

BACKGROUND OF THE INVENTION

This invention relates to the manipulation of electronic files used to visually display images produced by a control associated with a heating, ventilating, and air conditioning system.

The amount of content that needs to be displayed by a control associated with today's heating, ventilating, and air conditioning systems is increasing rapidly. This is occurring while at the same time there is an emphasis on cutting the costs of electronic components used in such embedded controls. In particular, the amount of content to be displayed impacts the amount of memory needed in these controls.

SUMMARY OF THE INVENTION

The present invention provides a set of processes for compressing and decompressing bitmapped picture files. The files preferably contain information to be displayed by a control associated with a heating, ventilating, and air conditioning system (hereinafter referred to as an HVAC system).

The process for compressing data begins with an examination of the first bitmapped pixel in a bitmapped file that is to be compressed. A programmed processor, either within the control or separate therefrom, counts the number of consecutive pixels having the same state as the first pixel. This number of consecutive pixels is used to generate a numerical representation of the counted number of pixels. The processor continues to analyze successive numbers of pixels of particular binary states and generating numerical representations as to the number of so counted pixels until the last pixel of a bitmapped picture file data is analyzed. The resulting compressed file consists of the value of the first pixel followed by a number of bytes containing a numerical representation of the number of pixels having binary values equal to the first pixel followed by further numbers of bytes having numerical representations of the number of pixels having first one binary value and then the other. This compressed file is stored in the memory of the control associated with the HVAC system.

The stored file is read from memory when it is to be displayed. The reading and decompressing of the stored file is the reverse of the compression of the file. In particular, the value of the first pixel is noted. A number of further bytes of information are thereafter analyzed to determine the appropriate number of pixels of the same value that are to be produced. The pixel value is changed and a number of further bytes of information are thereafter analyzed to determine the appropriate number of pixels of the changed pixel value that are to be produced. The changing of pixel value followed by an analysis of further bytes of information to determine the appropriate number of pixels of the changed pixel value to be produced is repeated until there are no more bytes of information to be analyzed.

In a preferred embodiment, the numerical representation is computed in the compression process by dividing a counted number, N, of consecutive pixels having a given binary value by a numerical constant. The numerical constant preferably has a mathematical relationship to the amount of bits in a byte of information. The resulting quotient is examined for having any remainder. If no remainder, then the resulting quotient having an integer "n" will be used by the processor to store "n−1" bytes having a zero value followed by a byte containing the numerical constant. If on the other hand, there is a remainder "r", then the processor stores "n" bytes having a zero value followed by a byte of information containing the value of "r".

BRIEF DESCRIPTION OF THE DRAWINGS

For a fuller understanding of the present invention, reference should now be made to the following detailed description taken in conjunction with the accompanying drawings wherein.

DESCRIPTION OF THE PREFERRED EMBODIMENTS

Figure 1:
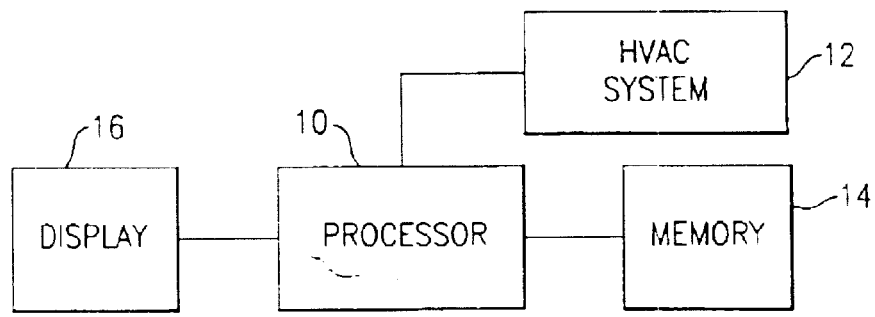
FIG. 1 is a block diagram of a processor within an HVAC system that processes electronic files from a memory for visual display.

Referring to FIG. 1, a processor 10 is operatively connected to an HVAC system 12 as well as to a memory 14 and a display 16. The processor 10 is operative to produce a file of information concerning the operation of the HVAC system 12. This file may be a bitmapped file for use in displaying the information on the display 16. The bitmap file is first compressed before being stored in the memory 14. The thus compressed bitmap file is thereafter available for reading and display on the display 16.

It is to be understood that bitmap files may be compressed and stored into the memory 14 by other than the processor 10. In this regard, there may be files of bitmapped information stored in the memory 14 that are compressed by a processor external to the control of FIG. 1 and thereafter stored in the memory 14.

Figure 2:
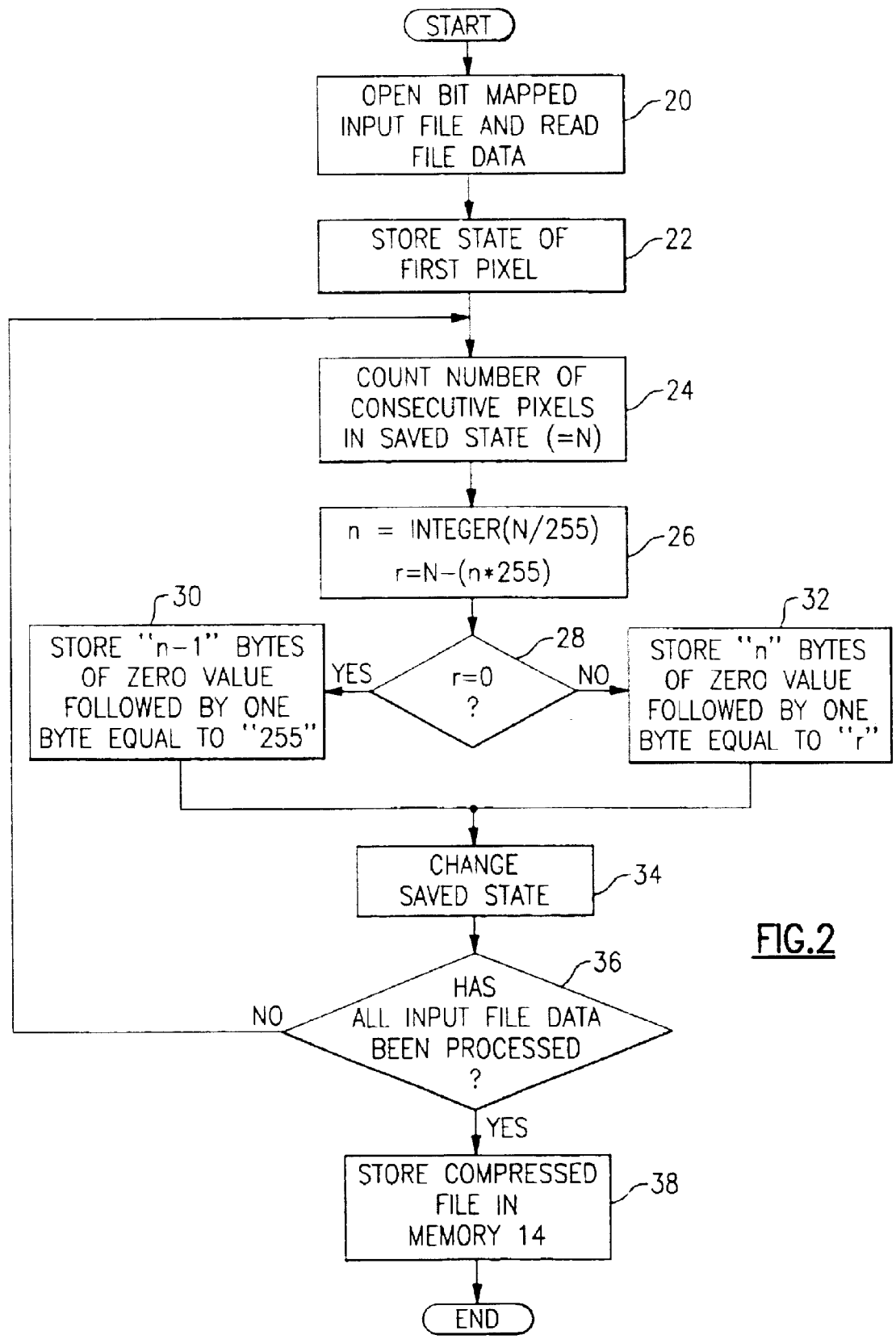
FIG. 2 is a flow chart of a process used to compress an electronic file produced during the control of the HVAC system of FIG. 1.

Referring now to FIG. 2, the process used by either the processor 10, or a processor external to the control of FIG. 1, to compress the bitmap file is illustrated in flow chart form. The process begins with a step 20 wherein the processor opens a bitmap file of data and reads the file data. The processor proceeds in a step 22 to store the binary state of the first pixel. The processor next proceeds in a step 24 to count the number of consecutive pixels having the same binary state as the first stored pixel. This counted number is set equal to "N". The processor proceeds in a step 26 to compute the quotient of "N" divided by the constant "255". It is to be noted that the constant "255" is the largest base ten number defined by an eight bit byte which is the byte size used in the invention.

Referring to step 20, the integer portion of the resultant quotient is set equal to "n". The processor also notes the remainder "r" resulting from the division of "N" by the constant "255". The remainder "r" is equal to the counted number of pixels "N" minus the integer "n" multiplied by the constant "255". The processor proceeds in a step 28 to inquire as whether the remainder "r" is equal to zero. In the event that "r" equals zero, the processor proceeds to step 30 and stores "n−1" bytes of zero value followed by a byte having a value equal to the constant "255". On the other hand, if the remainder "r" does not equal zero, then the processor proceeds in a step 32 to store "n" bytes of zero value followed by a byte having a value equal to the remainder "r".

The processor proceeds out of either steps 30 or 32 to a step 34 and changes the saved state by one before proceeding to step 36 to inquire as to whether all input file data have been processed. In the event that all file data has not been processed, then the processor proceeds along the no path back to step 24 wherein a count is made of the next occurring pixels in the input file that have the saved state of step 34. The count of pixels in the saved state is set equal to "N" in step 24. The processor proceeds in steps 26 through 32 to again compute the quotient comprising the integer "n" and the remainder "r" before storing the required number of zero bytes and either a byte equal to "255" or "r" in either step 30 or 32 and again changing the saved state by one in step 34. The processor always proceeds to step 36 after executing step 34. It is to be appreciated that all input file data will have been processed at some point. When this occurs, the processor proceeds from step 36 to step 38 and stores the resulting compressed file in memory 14.

The stored file will preferably consist of a first byte of information containing the value of the first pixel. This will be followed by a number of bytes which when taken together define the numerical representation of the number of pixels having the value of the first pixel. These bytes will be followed by a further number of bytes which when taken together define the numerical representation of the number of next occurring pixels having the opposite binary value to that of the first pixel. These bytes will be still further followed by a still further number of bytes which when taken together define the number of next occurring pixels having the opposite binary value to that of the previously counted pixels. The numerical representations in each instance will be the integer "n" expressed in a coded number of zero bytes followed by either a byte equal to "255" or to "r" depending on whether or not there is a remainder of "r".

Figure 3:
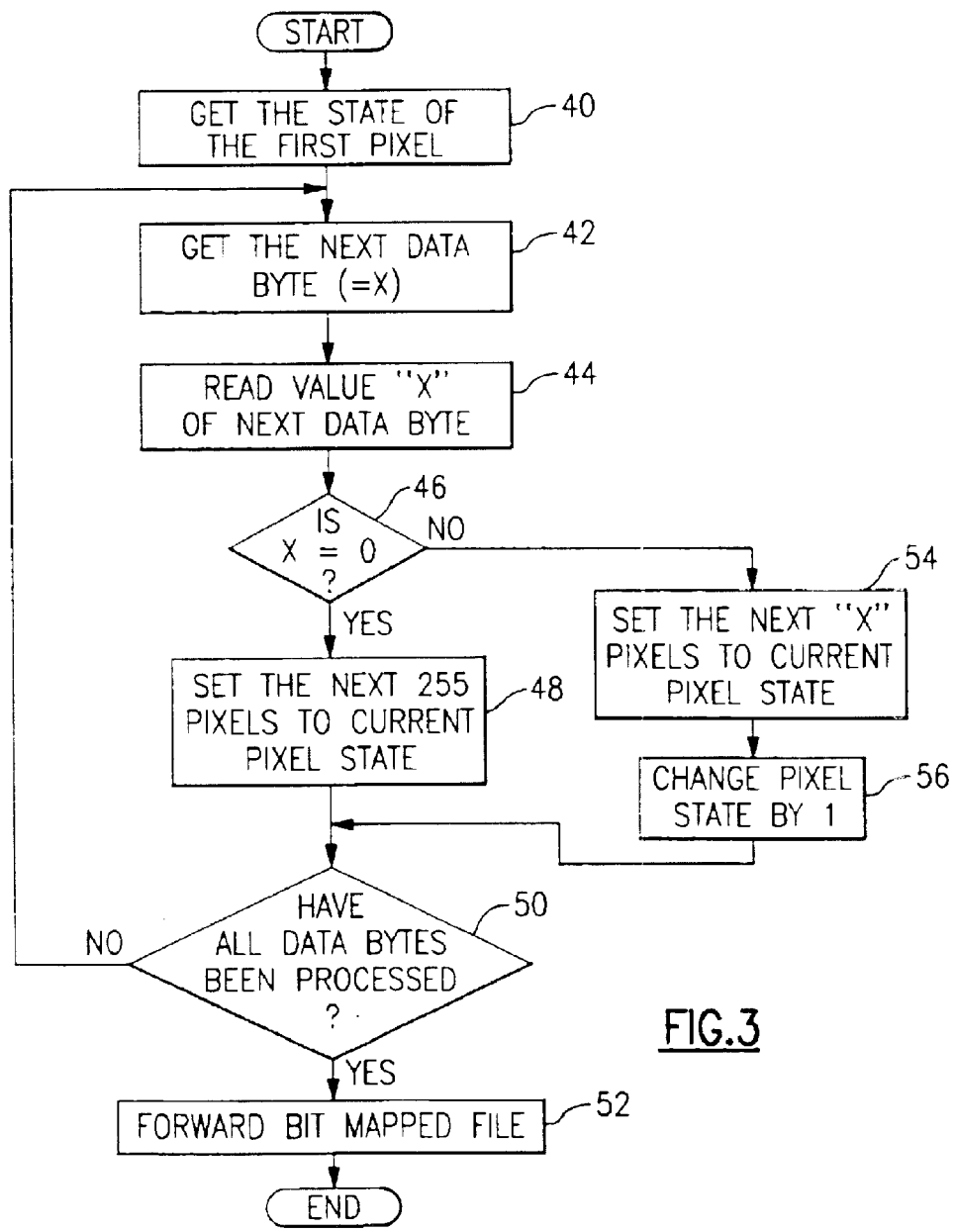
FIG. 3 is a flow chart of the process used to decompress the read file from the memory of FIG. 1 before displaying an image on the display in FIG. 1.

Referring now to FIG. 3, the process used by the processor 10 to read the compressed file stored in memory 14 is illustrated. This process begins with a step 40 wherein the processor reads the state of the first stored pixel in a step 40. The processor proceeds in a step 42 to retrieve the next data byte stored in memory 14. It is to be appreciated that this next data byte will either be a byte having a value of zero or a byte containing the constant "255" or the remainder "r". The value "X" of the byte is read in step 44 and examined as to whether it is equal to zero in a step 46. In the event that the byte value "X" is zero, then the processor will set the next 255 pixels equal to the current pixel state in a step 48. The processor will proceed out of step 48 to a step 50 and change the pixel state by binary one. The processor thereafter proceeds in step 52 to inquire as to whether all data bytes have been processed from memory 14.

Assuming that there are more data bytes to be processed, the processor will return to step 42 and retrieve the next data byte. The value "X" of the byte is read in step 44 and examined as to whether it is equal to zero in a step 46. If the value "X" of the numerical representation in the byte is not equal to zero, then the processor will proceed in a step 54 to set the next "X" number of pixels equal to the current pixel state. In this regard, the number of pixels set equal to the current pixel state will either be the numerical constant "255" or it will be "r".

The processor will proceed out of step 54 and change the pixel state by binary one in a step 56. The processor thereafter proceeds in step 50 to inquire as to whether all data bytes have been processed from memory 14. When all such data bytes have been processed, the processor will proceed in a step 52 to forward the decompressed bitmapped file for display on the display 16.

It is to be appreciated that a preferred embodiment of a set of processes has been disclosed for compressing and decompressing bitmap files of data that may be used for displaying visual images associated with the operation of an HVAC system. Alterations and modifications to the thus disclosed processes may occur without departing from the scope of the invention. Accordingly, the forgoing description of the preferred embodiment is to be limited only by the following claims and equivalents thereto.

What is claimed is:

1. A process for compressing electronic data files used to display images on a display of a control associated with a heating, ventilating, and air conditioning system, said process comprising the steps of:

noting the state of the first bit of a bitmapped file of information for an image to be displayed;

counting the number of consecutive bits having the same binary state as the first bit;

generating a numerical representation of the counted number of consecutive bits having the same binary state as the first bit;

counting the number of consecutive bits having the binary state of the next bit in the bitmapped file of information and thereafter generating a numerical representation of the counted number of consecutive bits having the same binary state as the next bit in the bitmapped file; and repeatedly counting the next number of consecutive bits having a binary state differing from that of the binary state of the previously counted number of consecutive bits and thereafter generating a numerical representation of the next number of consecutive bits having the binary state differing from that of the binary state of the previously counted number of consecutive bits until there are no remaining bits of information to be counted in the bitmapped file.

2. The process of claim 1 wherein each of said steps of generating a numerical representation of the counted number of consecutive bits comprises the steps of:

dividing the count of consecutive bits by a constant;

defining a numerical representation as to the multiple of the constant when there is no remainder in the resulting quotient; and defining a numerical representation as to the multiple of the constant plus the remainder when the resulting quotient includes a remainder.

3. The process of claim 2 wherein said step of defining a numerical representation as to the multiple of the constant comprises the step of:

defining a number of equal valued bytes of information, the number of such bytes being equal to the multiple of the constant, the number of equal value bytes being followed by a further byte equal to the constant.

4. The process of claim 3 wherein said step of defining a numerical representation as to the multiple of the constant plus the remainder when the quotient includes a remainder comprises the step of:

defining a number of equal valued bytes of information wherein the number of such bytes is equal to the multiple of the constant, the number of equal value bytes being followed by a further byte equal to the remainder.

5. The process of claim 2 wherein the constant is representative of the maximum numerical value of a byte of information.

6. A process for reading a stored file of information used to display images on a display within a control associated with a heating, ventilating, and air conditioning system comprising the steps of:

reading the state of the first pixel from the stored file of information;

reading a plurality of equally valued bytes of information from the stored file of information;

setting the same number of pixels equal to the state of the first pixel for each equally valued byte of information that is read wherein this same number of pixels is not the value of each of the equally valued bytes of information;

reading a byte of information from the stored file of information that is not the value of each of the equally valued bytes of information;

setting a number of pixels equal to the value of the read byte of information that is not the value of each of the equally valued bytes of information;

reading a further plurality of equally valued bytes of information from the stored file of information;

setting the same number of pixels equal to a state opposite from the state of the previously set number of pixels for each of the further equally valued bytes of information that are read wherein the same number of pixels equal to a state opposite from the state of the previously set number of pixels is in each case not the value of each of the equally valued bytes of information;

reading a byte of information from the stored file of information that is not the value of each of the equally valued bytes of information;

setting a number of pixels equal to the value of the read byte of information; and repeating said steps of reading a further plurality of equally valued bytes of information from the stored file of information and setting the same number of pixels equal to a state opposite from the state of the previously set number of pixels for each of the further equally valued bytes of information that are read and further reading a byte of information from the stored file of information that is not the value of each of the equally valued bytes of information; and setting a number of pixels equal to the value of the read byte of information until all bytes of information have been read.

7. The process of claim 6 wherein said step of setting a number of pixels equal to the value of the read byte of information that is not the value of each of the equally valued bytes of information comprises the steps of:

determining whether the read byte of information is equal to a predefined value;

defining a prescribed number of next occurring pixels based on the predefined value when the read byte of information is equal to the predefined value; and defining a prescribed number of next occurring pixels based on the numerical value of the read byte of information when the numerical value of the read byte of information is not the predefined value.

8. The process of claim 7 wherein the prescribed number of pixels in said step of defining a prescribed number of next occurring pixels based on the numerical value of the read byte of information is a constant representative of the maximum numerical value of the number of bits in a byte.

9. A system for displaying bitmapped files of data used to display images associated with the control of a heating, ventilating, and air conditioning system, said system comprising:

a memory for storing information;

a display for displaying images;

a processor operative to read information stored in said memory wherein said stored information includes a number of bytes of information collectively defining a numerical representation as to the number of consecutive pixels in an image equal to a first pixel state followed by a number of bytes of information collectively defining a numerical representation as to the number of consecutive pixels in the image equal to a second pixel state opposite to said first pixel state, each number of bytes including a number of equally valued bytes wherein the number of equally valued bytes is an integer obtained by dividing the number of consecutive pixels in the image of the given state by a numerical constant.

10. The system of claim 14 wherein each number of bytes of information defining a numerical representation includes either a byte having the numerical constant or a byte having a remainder generated by the division of the number of consecutive pixels in the image of the given state by the numerical constant.

11. The system of claim 14 wherein the numerical constant is representative of the maximum numerical value of a byte of information.

* * * * *